(12) United States Patent
Stober et al.

(10) Patent No.: US 8,422,408 B2
(45) Date of Patent: Apr. 16, 2013

(54) REMOTE CONNECTION TO A TELEPHONE LINE VIA INTERNET

(75) Inventors: Mark W. Stober, Lutz, FL (US); Kiran Patel, Wesley Chapel, FL (US); Jyothival Shivan, Tampa, FL (US); Andrew Miller, Land O'Lakes, FL (US); Sutap Chatterjee, Tampa, FL (US); Khalid Ahmed, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1243 days.

(21) Appl. No.: 11/848,894

(22) Filed: Aug. 31, 2007

(65) Prior Publication Data

US 2009/0059896 A1    Mar. 5, 2009

(51) Int. Cl.
*H04L 12/16*    (2006.01)

(52) U.S. Cl.
USPC .............................................. 370/271; 379/74

(58) Field of Classification Search .................. 370/271, 370/315, 352, 356, 384, 401, 426; 379/207.02, 379/233, 207.13, 67.1, 74; 455/410, 411, 455/420, 414.1
See application file for complete search history.

(56) References Cited

U.S. PATENT DOCUMENTS

| | | | |
|---|---|---|---|
| 6,516,061 B2* | 2/2003 | Horowitz et al. | 379/233 |
| 2001/0036171 A1* | 11/2001 | Tonnby et al. | 370/352 |
| 2002/0138635 A1* | 9/2002 | Redlich et al. | 709/229 |
| 2004/0165579 A1* | 8/2004 | Mandle | 370/352 |
| 2005/0152347 A1* | 7/2005 | Chen et al. | 370/356 |
| 2005/0287989 A1* | 12/2005 | Lee | 455/411 |
| 2006/0159246 A1* | 7/2006 | Abramson et al. | 379/207.02 |
| 2006/0177016 A1* | 8/2006 | Gallick et al. | 379/67.1 |
| 2007/0049248 A1* | 3/2007 | Dawson et al. | 455/410 |
| 2007/0118656 A1* | 5/2007 | Anderson et al. | 709/227 |
| 2007/0165554 A1* | 7/2007 | Jefferson et al. | 370/315 |

* cited by examiner

*Primary Examiner* — Hassan Phillips
*Assistant Examiner* — Ajay Cattungal

(57) ABSTRACT

A device receives a request from an Internet Protocol (IP)-based device to create a virtual extension of a plain old telephone service (POTS)-based telephone line, authenticates the IP-based device for association with the POTS-based telephone line, and creates the virtual extension of the POTS-based telephone line to the IP-based device when the IP-based device is authenticated.

23 Claims, 10 Drawing Sheets

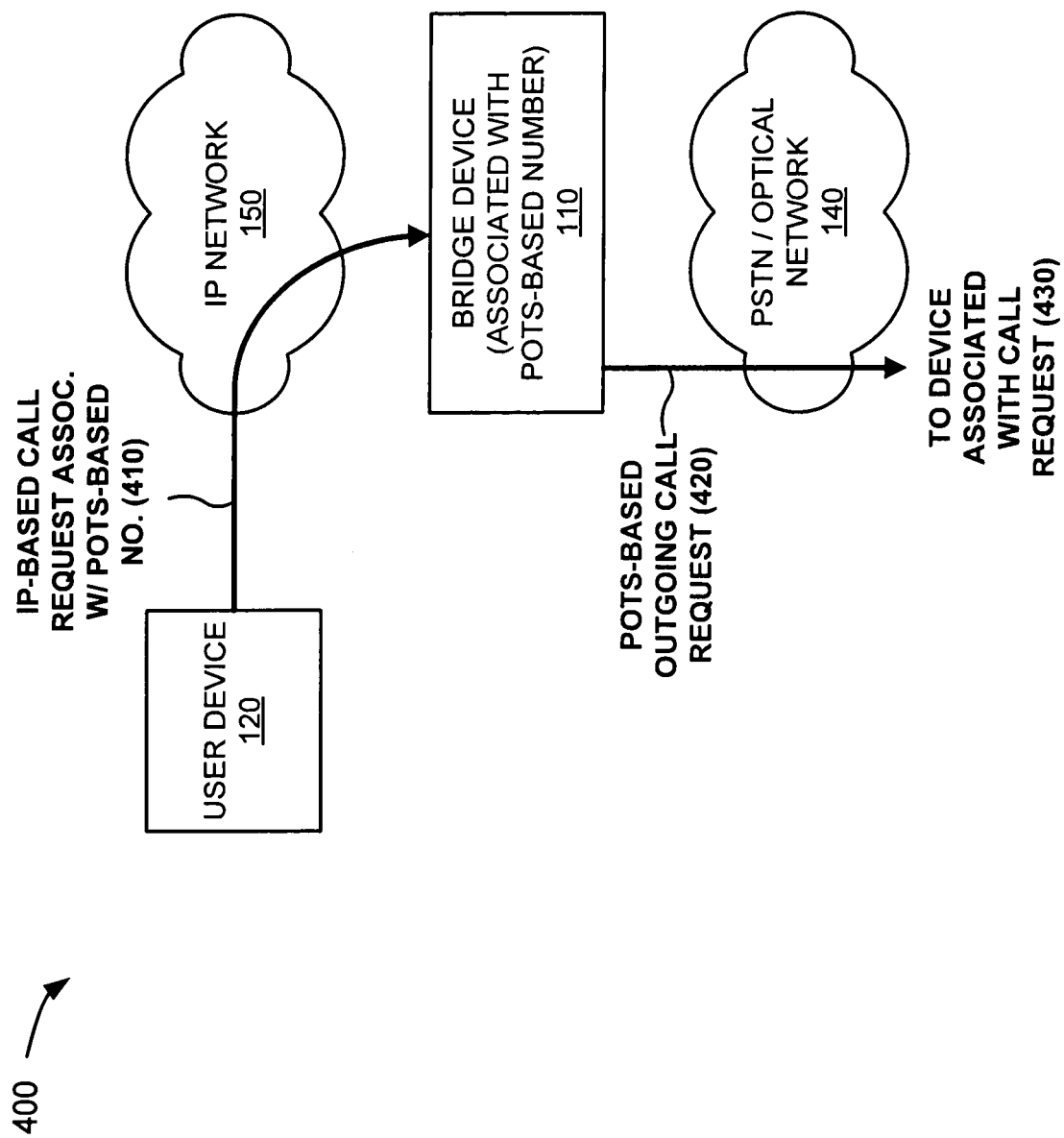

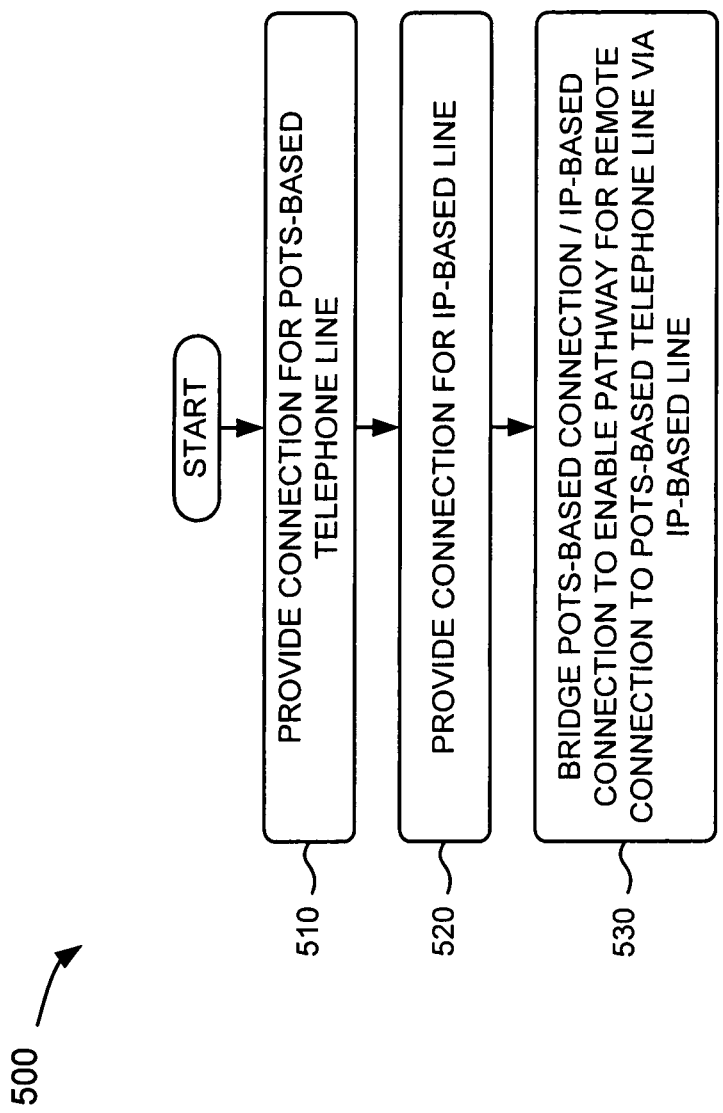

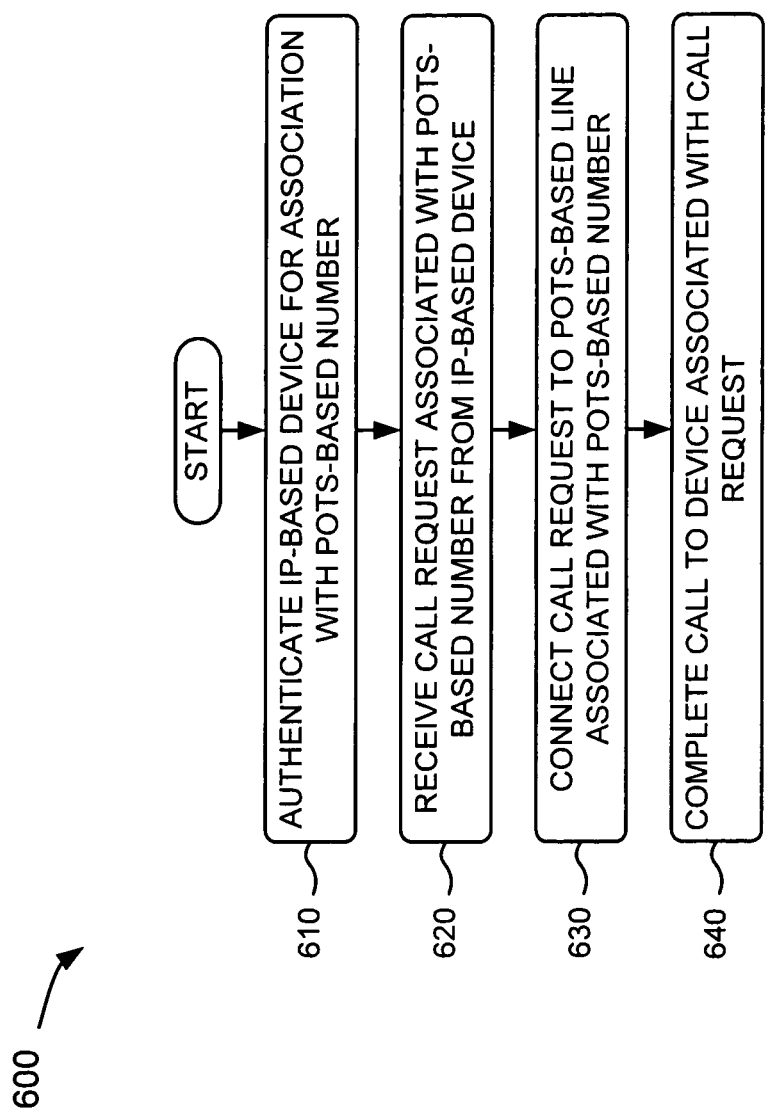

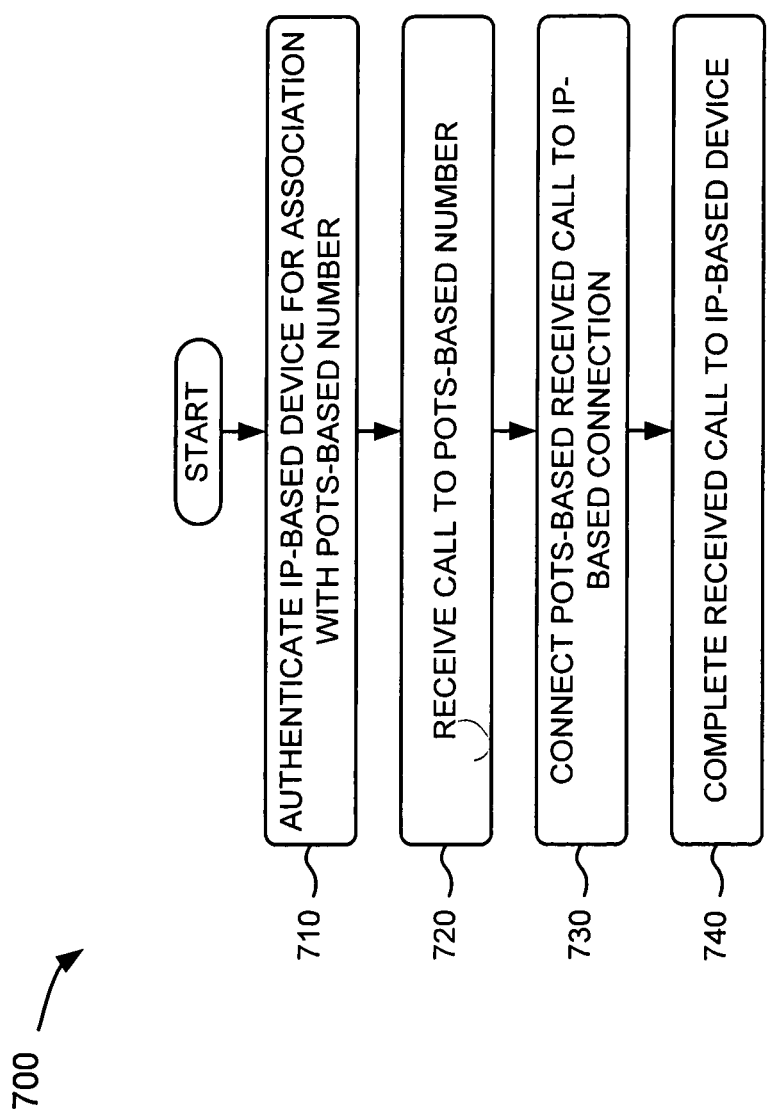

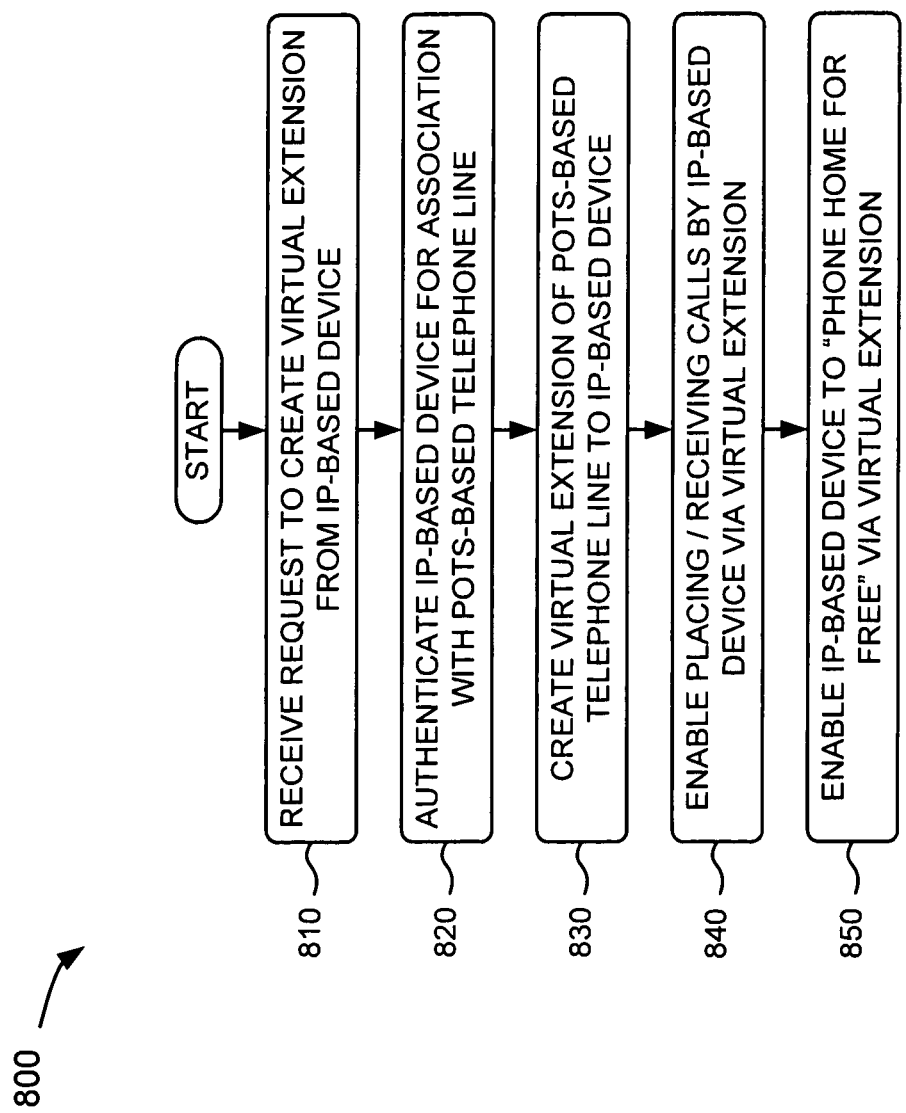

REMOTE CONNECTION TO A TELEPHONE LINE VIA INTERNET

BACKGROUND

Conventional technology connects analog telephone (i.e., plain old telephone service (POTS)) systems and/or equipment with outgoing voice over Internet Protocol (VoIP) or Digital Subscriber Line (DSL) connections. VoIP is a technology that allows a user to make voice calls using a broadband Internet connection instead of a regular (e.g., analog) phone line. Some VoIP services may only allow the user to call other people using the same service, but others may allow the user to call anyone who has a telephone number, including local, long distance, mobile, and international numbers. DSL is a wireline transmission technology that transmits data faster over traditional copper telephone lines already installed to homes and businesses. Such conventional arrangements enable connection with an IP-based network via a POTS-based telephone line.

BRIEF DESCRIPTION OF THE DRAWINGS

FIG. 4A illustrates a portion of the network depicted in FIG. 1, where the portion of the network may connect an IP-based call request via a PSTN and/or optical network;

FIGS. 5-8 depict flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and methods that allow a POTS-based telephone line to be operated from a remote device that may be connected via an IP network (e.g., the Internet). For example, in one implementation, the systems and methods may allow a user to place and/or receive calls through a POTS-based telephone number (e.g., a home telephone number), and/or may allow the user to keep in contact with other people in the home and/or at work. The systems and methods may provide to the user the same telephone capabilities as if the user picked up a telephone in another room in the home. However, since an IP network may be used, the user may be located anywhere in the world instead of in another room.

Figure 1:
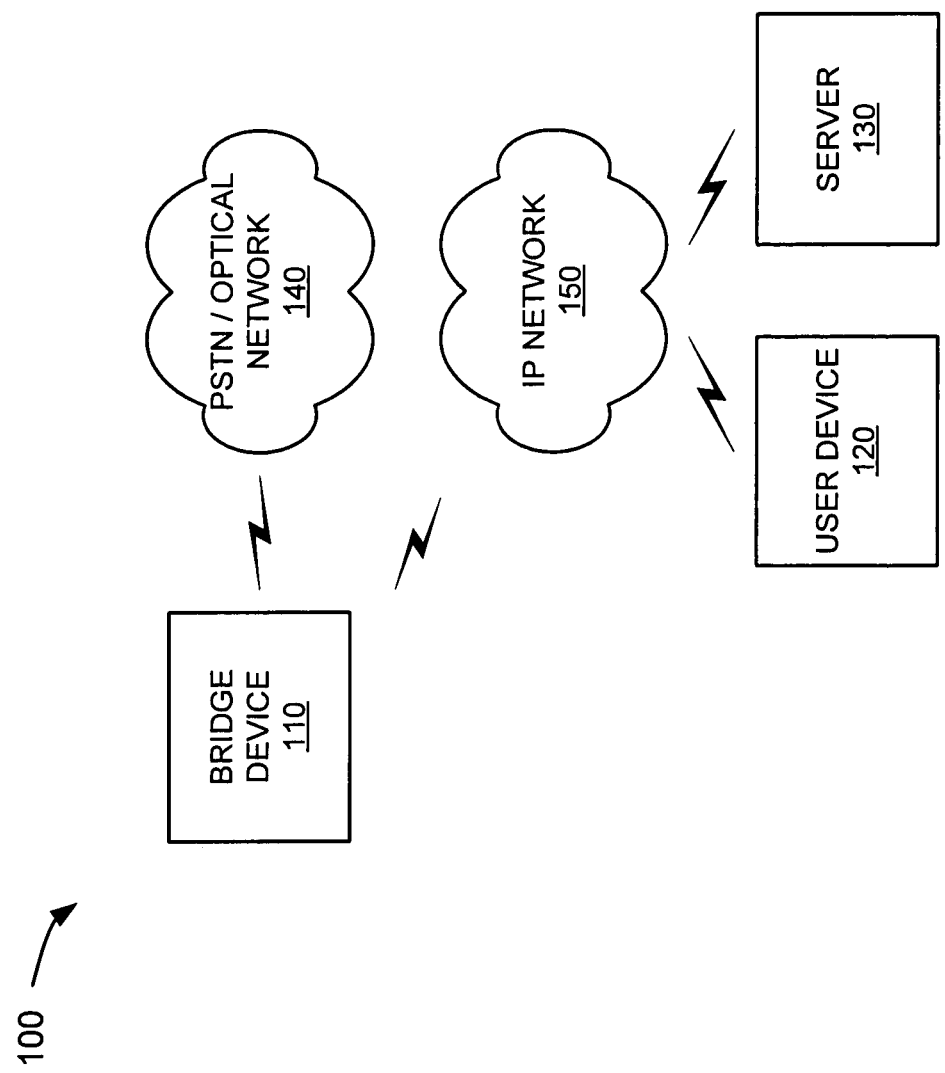
FIG. 1 is an exemplary diagram of a network in which systems and methods described herein may be implemented.

FIG. 1 is an exemplary diagram of a network 100 in which systems and methods described herein may be implemented. As illustrated, network 100 may include a bridge device 110, a user device 120, a server 130, a PSTN and/or optical network 140, and/or an IP network 150. Bridge device 110, user device 120, and/or server 130 may connect to PSTN/optical network 140 and/or IP network 150 via wired and/or wireless connections. One bridge device, one user device, one server, and two networks have been illustrated in FIG. 1 for simplicity. In practice, there may be more bridge devices, user devices, servers, and/or networks than depicted in FIG. 1.

Bridge device 110 may include a device that provides a bridge or interface between an IP connection (e.g., IP network 150) and a telephone line (e.g., a POTS-based home and/or business telephone line connected to PSTN network 140). In one implementation, bridge device 110 may be incorporated into a modem (e.g., a DSL modem) if bridge device 110 connects to a PSTN network (e.g., network 140). In another implementation, bridge device 110 may be incorporated into an optical network terminal (ONT) if bridge device 110 connects to an optical network (e.g., network 140). An ONT may include a device that terminates an optical network, and provides an interface between the optical network and a customer's premises. In other implementations, bridge device 110 may include a stand-alone device that provides the bridge between the IP connection and the home telephone line.

Bridge device 110 may include interfaces or ports for receiving a telephone line (e.g., a POTS-based telephone line) connected to PSTN/optical network 140, and/or for receiving an IP-based line (e.g., an Ethernet cable) connected to IP network 150. Bridge device 110 may create a pathway that enables a remote user (e.g., via user device 120 and IP network 150) to connect to or access the telephone line from anywhere, and/or to place and/or receive calls via the telephone line (e.g., via PSTN/optical network 140). Bridge device 110 may provide an arrangement (e.g., connection with a POTS-based telephone line via an IP-based network) that is the opposite of the conventional arrangement (e.g., connection with an IP-based network via a POTS-based telephone line) described above.

In one exemplary implementation, bridge device 110 may receive a request, from a remote IP-based device (e.g., user device 120), to create a virtual extension of a telephone line (e.g., a POTS-based telephone line) connecting bridge device 110 to PSTN/optical network 140. Bridge device 110 may authenticate (e.g., using a public key infrastructure) user device 120 for association with the telephone line to prevent unauthorized access of the telephone line. If user device 120 is authenticated, bridge device 110 may create the virtual extension of the telephone line to the remote IP-based device (i.e., user device 120). A "virtual extension," as the term is used herein, is to be broadly interpreted to include any hardware-based, software-based, and/or combined hardware and/or software-based mechanism that may permit access to and operation of a telephone line (e.g., connected to PSTN/optical network 140) via an IP-based device (e.g., a device connected to IP network 150, user device 120, etc.). A virtual extension may enable a user, connected via IP network 150 with the telephone line (e.g., via user device 120), to receive an incoming call on the telephone line, to place an outgoing call on the telephone line, and/or to join in a conference with other devices (e.g., a POTS-based telephone associated with the telephone line, other user devices connected to the telephone line, etc.) on the telephone line. For example, a user away from home may access (e.g., with user device 120) their home telephone line (e.g., via the virtual extension created by bridge device 110), and may place and/or receive calls within a home calling area without accruing toll charges or spending money on additional equipment and/or services (e.g., additional wireless telephone minutes).

In another example, the virtual extension of the telephone line may enable the remote IP-based device (e.g., user device 120) to "phone home for free." For example, a user away from home may access (e.g., with user device 120) their home telephone line (e.g., via the virtual extension), and may use an intercom feature (e.g., a feature that may send a signal from one handset to another handset to enable the handsets to be used as a two-way intercom) to call a home device (e.g., a handset) associated with the home telephone line. The intercom feature may cause the home device to ring, and, if answered, may connect the remote user to the home device without accruing toll charges or spending money on additional equipment and/or services. Further details of bridge device 110 are provided below in connection with FIGS. 3A and 3B.

User device 120 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, or other types of computation or communication devices, threads or processes running on these devices, and/or objects executable by these devices. In one implementation, user device 120 may include any device (i.e., an IP-based device) that is capable of accessing IP network 150, and may include a software application that enables user device 120 to remotely access a telephone line (e.g., a POTS-based telephone line) associated with PSTN/optical network 140, via bridge device 110. In another implementation, user device 120 may access a web-based application (e.g., provided by IP network 150) that enables user device 120 to remotely access a telephone line associated with PSTN/optical network 140, via bridge device 110. In other implementations, user device 120 may access a server (e.g., server 130 connected to IP network 150) that includes software to enable user device 120 to remotely access a telephone line associated with PSTN/optical network 140, via bridge device 110. Further details of user device 120 are provided below in connection with FIG. 2.

Server 130 may include one or more server entities that gather, process, search, and/or provide information in a manner described herein. In one implementation, server 130 may connect to IP network 150 and may include software to facilitate remote access (e.g., by user device 120) to a telephone line associated with PSTN/optical network 140, via bridge device 110. For example, bridge device 110 may register an address (e.g., its IP address) with server 130, and server 130 may resolve the address to a telephone number (e.g., a telephone number associated with the telephone line connected to bridge device 110) if a remote user (e.g., via user device 120) wishes to connect to the telephone line. Server 130 may provide security authentication (e.g., using a public key infrastructure) for the remote user to prevent unauthorized access of the telephone line. Further details of server 130 are provided below in connection with FIG. 2.

PSTN/optical network 140 may include a Public Land Mobile Network (PLMN), a telephone network, such as the Public Switched Telephone Network (PSTN) or a cellular telephone network, an optical network (e.g., a passive optical network (PON), a broadband PON (B-PON), an Ethernet PON (E-PON), etc.), or a combination of networks that provide voice services (e.g., telephony services). In one implementation, PSTN/optical network 140 may provide telephony services via POTS-based (e.g., analog) systems. In other implementations, PSTN/optical network 140 may provide telephony services via a voice portion of optical systems (e.g., via a voice portion of a PON).

IP network 150 may include a local area network (LAN), a wide area network (WAN), a metropolitan area network (MAN), an intranet, the Internet, and/or a combination of networks. In one implementation, IP network 150 may include the Internet, and/or a network that provides access to the Internet.

Although FIG. 1 shows exemplary components of network 100, in other implementations, network 100 may contain fewer, different, or additional components than depicted in FIG. 1. In still other implementations, one or more components of network 100 may perform one or more other tasks described as being performed by one or more other components of network 100.

Figure 2:
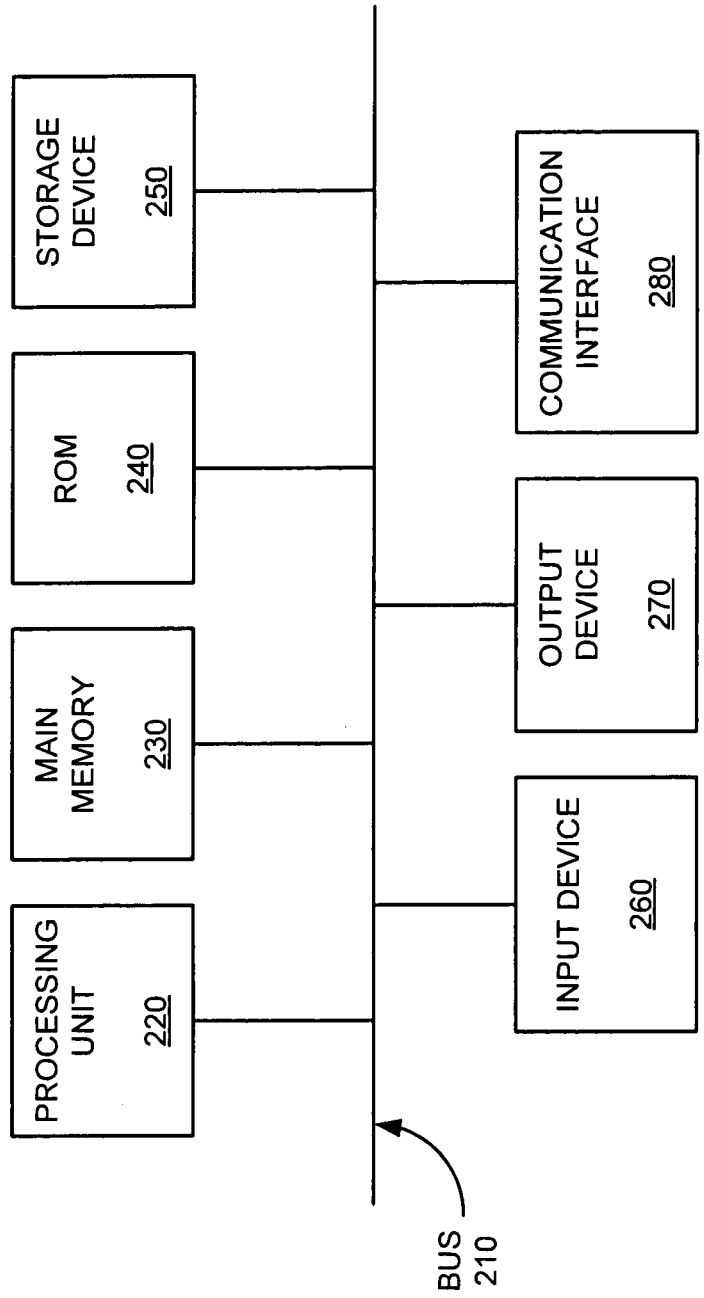
FIG. 2 illustrates exemplary components of a user device and/or a server of the network depicted in FIG. 1.

FIG. 2 illustrates exemplary components of user device 120 and/or server 130 (hereinafter referred to as "user device/server 120/130"). As illustrated, user device/server 120/130 may include a bus 210, a processing unit 220, a main memory 230, a read-only memory (ROM) 240, a storage device 250, an input device 260, an output device 270, and/or a communication interface 280. Bus 210 may include a path that permits communication among the components of user device/server 120/130.

Processing unit 220 may include a processor, a microprocessor, or other types of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to user device/server 120/130, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables user device/server 120/130 to communicate with other devices and/or systems. For example, communication interface 280 may include mechanisms for communicating with another device or system via a network, such as PSTN/optical network 140 and/or IP network 150.

As described herein, user device/server 120/130 may perform certain operations in response to processing unit 220 executing software instructions contained in a computer-readable medium, such as main memory 230. A computer-readable medium may be defined as a physical or logical memory device and/or carrier wave. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of user device/server 120/130, in other implementations, user device/server 120/130 may contain fewer, different, or additional components than depicted in FIG. 2. In still other implementations, one or more components of user device/server 120/

130 may perform one or more other tasks described as being performed by one or more other components of user device/server 120/130.

Figure 3A:
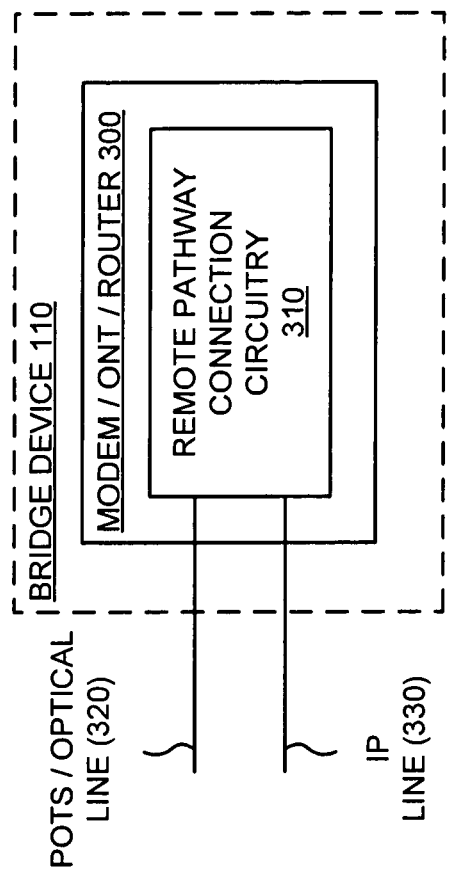
FIG. 3A is a diagram depicting exemplary components of an embodiment of a bridge device of the network depicted in FIG. 1.

FIG. 3A is a diagram depicting exemplary components of an embodiment of bridge device 110. As illustrated, bridge device 110 may include a modem, optical network terminal (ONT), and/or router 300 that includes remote pathway connection circuitry 310. Modem/ONT/router 300 may receive a POTS and/or optical line 320, and/or an IP line 330.

If network 140 is a PSTN network, modem/ONT/router 300 may include a modem device (e.g., a DSL modem) and/or a router that joins POTS line 320 (e.g., a standard POTS telephone line) and IP line 330 (e.g., an Ethernet cable) in a single box. The modem device and/or router may bridge signals from POTS line 320, and/or may convert the signals into a digital signal to be sent to and/or received by a device (e.g., a personal computer) via IP line 330. The digital signal may be used, for example, to provide an IP-based service (e.g., Internet access) to the personal computer.

If network 140 is an optical network, modem/ONT/router 300 may include an ONT. The ONT may include a device that terminates the optical network, and provides an interface between the optical network and the customer's premises. In one implementation, the ONT may provide multiple service interfaces for the customer (e.g., it may provide an interface for telephony (i.e., voice) services, an interface for Ethernet (i.e., data) services, an interface for television (i.e., video) services, etc.). In other implementations, the ONT may join optical line 320 and IP line 330 in a single box.

Remote pathway connection circuitry 310 may provide additional circuitry for (and/or modify circuitry of) modem/ONT/router 300 that may tap into a voice portion of POTS/optical line 320, and/or may create a bridge between POTS/optical line 320 and IP line 330. For example, remote pathway connection circuitry 310 may include hardware (e.g., processing logic), software, and/or a combination of hardware and software that taps into the voice portion of POTS/optical line 320, and/or creates the bridge between POTS/optical line 320 and IP line 330. In one implementation, remote pathway connection circuitry 310 may create a pathway for remote connection from an IP-based device (e.g., user device 120), via IP line 330, into POTS/optical line 320. In other implementations, remote pathway connection circuitry 310 may include hardware and/or embedded software that bridges telephony services provided by PSTN/optical network 140 to an IP-based network (e.g., IP network 150). For example, remote pathway connection circuitry 310 may bridge telephony services provided by the PSTN to a WAN interface connected to an Internet gateway.

If network 140 is a PSTN network, POTS/optical line 320 may include a POTS-based telephone line and/or any connectors, interfaces, etc. used to connect a POTS-based telephone line to modem/ONT/router 300. If network 140 is an optical network, POTS/optical line 320 may include an optical line (e.g., a fiber optic-based line) and/or any connectors, interfaces, etc. used to connect an optical line to modem/ONT/router 300. In one implementation, POTS/optical line 320 may provide a communication link between PSTN/optical network 140 and/or modem/ONT/router 300.

IP line 330 may include any mechanism capable of providing a communication link between IP network 150 and/or modem/ONT/router 300. In one implementation, for example, IP line 330 may include an Ethernet cable.

Figure 3B:
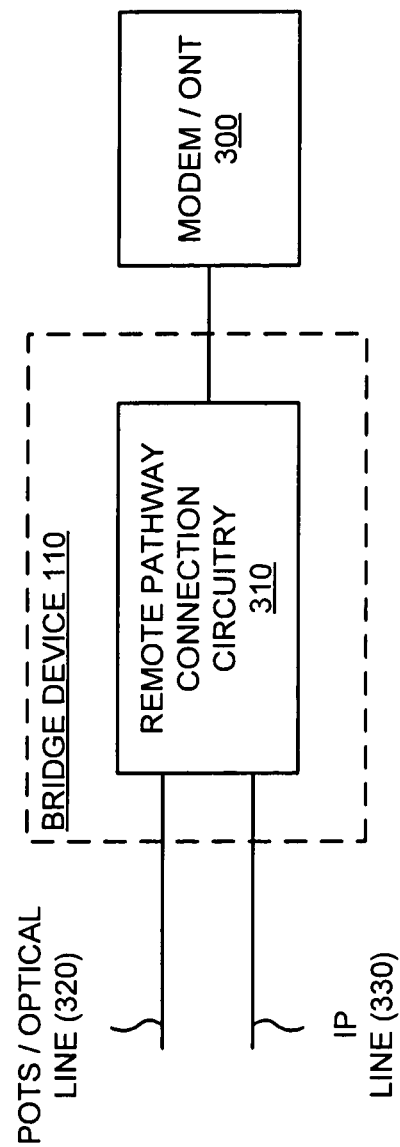
FIG. 3B is a diagram depicting exemplary components of another embodiment of the bridge device of the network depicted in FIG. 1.

FIG. 3B is a diagram depicting exemplary components of another embodiment of bridge device 110. As illustrated, bridge device 110 may be separate from modem/ONT/router 300, and/or may include remote pathway connection circuitry 310. Remote pathway connection circuitry 310 (i.e., bridge device 110) may receive POTS/optical line 320 and/or IP line 330. In this embodiment, modem/ONT/router 300 may perform the functions described above in connection with FIG. 3A. However, modem/ONT/router 300 may not perform the functions described above as being performed by remote pathway connection circuitry 310 since modem/ONT/router 300 does not incorporate remote pathway connection circuitry 310. Instead, bridge device 110 (e.g., as a stand alone device) may perform the functions described above as being performed by remote pathway connection circuitry 310.

Although FIGS. 3A and 3B show exemplary components of bridge device 110, in other implementations, bridge device 110 may contain fewer, different, or additional components than depicted in FIGS. 3A and 3B. In still other implementations, one or more components of bridge device 110 may perform one or more other tasks described as being performed by one or more other components of bridge device 110.

FIG. 4A illustrates a portion 400 of network 100 that connects an IP-based call request 410 via PSTN/optical network 140. Prior to generating IP-based call request 410, user device 120 may access bridge device 110 associated with a POTS-based telephone number. For example, as described above in connection with FIG. 1, user of user device 120 (e.g., a softphone equipped personal computer) may generate a request (e.g., a connection request) to access bridge device 110 associated with the user's home/work POTS-based telephone number. Bridge device 110 may receive the access/connection request (e.g., requesting creation of a virtual extension of a POTS-based telephone line connecting bridge device 110 to PSTN/optical network 140) from user device 120. Bridge device 110 may authenticate (e.g., using a public key infrastructure) user device 120 for association with the telephone line to prevent unauthorized access of the telephone line. If user device 120 is authenticated, bridge device 110 may create a virtual extension of the telephone line (e.g., associated with the user's telephone number) to user device 120. As further shown in FIG. 4A, user device 120 may communicate IP-based call request 410 to IP network 150, and/or IP network 150 may route call request 410 to bridge device 110. For example, user device 120 may place a call to a telephone number within the local calling area associated with the POTS-based telephone number.

As further shown in FIG. 4A, bridge device 110 may generate an outgoing POTS-based call request 420 from IP-based call request 410. For example, with reference to FIGS. 3A and 3B, bridge device 110 (e.g., via remote pathway connection circuitry 310) may tap into a voice portion of POTS/optical line 320, and/or may create a bridge between POTS/optical line 320 and IP line 330 to generate outgoing POTS-based call request 420 from IP-based call request 410. Bridge device 110 may complete outgoing POTS-based call request 420 by sending outgoing POTS-based call request 420 to a device associated with call request 420, via PSTN/optical network 140. PSTN/optical network 140 may receive outgoing POTS-based call request 420 from bridge device 110, and may route call request 420 to the device associated with call request 420, as indicated by reference number 430. For example, PSTN/optical network 140 may route call request 420 to the telephone number dialed by user device 120 (e.g., a telephone number within the local calling area).

Figure 4B:
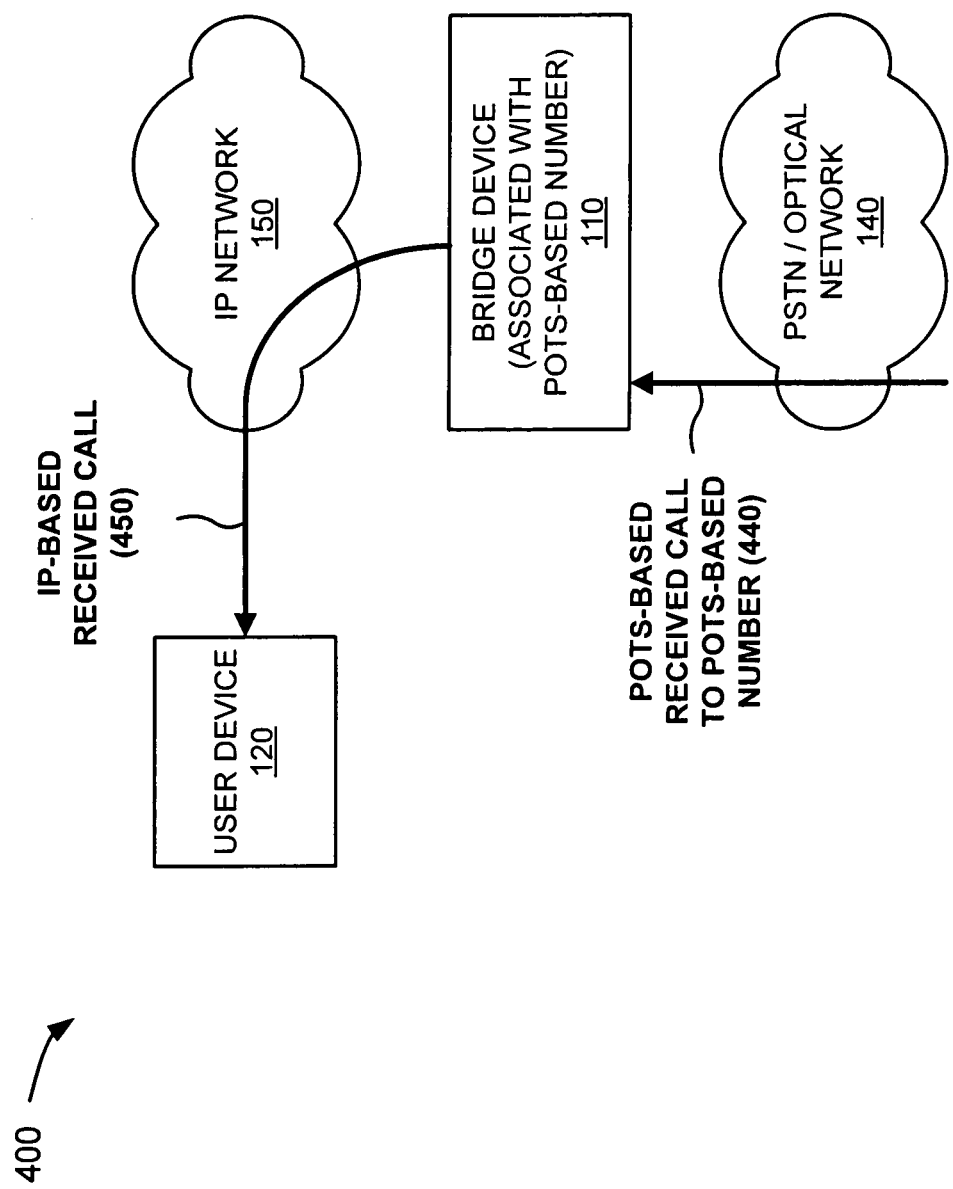
FIG. 4B illustrates a portion of the network depicted in FIG. 1, where the portion of the network may connect a received call from the PSTN and/or optical network to an IP-based user device.

FIG. 4B illustrates network portion 400 that connects a POTS-based received call 440 from PSTN/optical network 140 to IP-based user device 120. Prior to receiving POTS-based received call 440, user device 120 may access bridge device 110 associated with a POTS-based telephone number.

For example, as described above in connection with FIG. 1, user of user device 120 (e.g., a laptop) may generate a request (e.g., a connection request) to access bridge device 110 associated with the user's home/work POTS-based telephone number. Bridge device 110 may receive the access/connection request (e.g., requesting creation of a virtual extension of a POTS-based telephone line connecting bridge device 110 to PSTN/optical network 140) from user device 120. Bridge device 110 may authenticate (e.g., using a public key infrastructure) user device 120 for association with the telephone line to prevent unauthorized access of the telephone line. If user device 120 is authenticated, bridge device 110 may create a virtual extension of the telephone line (e.g., associated with the user's home telephone number) to user device 120.

As further shown in FIG. 4B, bridge device 110 may receive POTS-based received call 440, and/or may generate an IP-based received call 450 from POTS-based received call 440. For example, with reference to FIGS. 3A and 3B, bridge device 110 (e.g., via remote pathway connection circuitry 310) may tap into a voice portion of POTS/optical line 320, and/or may create a bridge between POTS/optical line 320 and IP line 330 to generate IP-based received call 450 from POTS-based received call 440. Bridge device 110 may complete IP-based received call 450 by sending IP-based received call 450 to user device 120, via IP network 150. IP network 150 may receive IP-based received call 450, and/or may route IP-based received call 450 to user device 120. For example, IP network 150 may route IP-based received call 450 to a user device associated with bridge device 110 (e.g., with the POT-based telephone number associated with bridge device 110).

Although FIGS. 4A and 4B show exemplary components of network portion 400, in other implementations, network portion 400 may contain fewer, different, or additional components than depicted in FIGS. 4A and 4B. In still other implementations, one or more components of network portion 400 may perform one or more other tasks described as being performed by one or more other components of network portion 400.

FIG. 5 depicts a flow chart of an exemplary process 500 for allowing a POTS-based telephone line to be operated from a remote device that may be connected via an IP network according to implementations described herein. In one implementation, process 500 may be performed by bridge device 110. As illustrated, process 500 may begin with providing a connection for a POTS-based line (block 510), and/or providing a connection for an IP-based line (block 520). For example, in one implementation described above in connection with FIG. 1, bridge device 110 may include interfaces or ports for receiving a telephone line (e.g., a POTS-based telephone line) connected to PSTN/optical network 140, and/or for receiving an IP-based line (e.g., an Ethernet cable) connected to IP network 150.

As further shown in FIG. 5, the POTS-based connection and the IP-based connection may be bridged to enable creation of a pathway for remote connection to a POTS-based telephone line via an IP-based line (block 530). For example, in one implementation described above in connection with FIGS. 3A and 3B, remote pathway connection circuitry 310 of bridge device 110 may tap into a voice portion of POTS/optical line 320, and/or may create a bridge between POTS/optical line 320 and IP line 330. In one example, remote pathway connection circuitry 310 may create a pathway for remote connection from an IP-based device (e.g., user device 120), via IP line 330, into POTS/optical line 320. In another example, remote pathway connection circuitry 310 may include hardware and/or embedded software that bridges telephony services provided by PSTN/optical network 140 to an IP-based network (e.g., IP network 150).

FIG. 6 depicts a flow chart of an exemplary process 600 for connecting a call request, associated with a POTS-based telephone number, from an IP-based device according to implementations described herein. In one implementation, process 600 may be performed by bridge device 110. As illustrated, process 600 may begin by authenticating the IP-based device for association with the POTS-based telephone number (block 610), and/or receiving a call request associated with the POTS-based telephone number from an IP-based device (block 620). For example, in one implementation described above in connection with FIG. 4A, prior to generating IP-based call request 410, user of user device 120 may generate a request (e.g., a connection request) to access bridge device 110 associated with the user's home/work POTS-based telephone number. Bridge device 110 may receive the access/connection request (e.g., requesting creation of a virtual extension of a POTS-based telephone line connecting bridge device 110 to PSTN/optical network 140) from user device 120. Bridge device 110 may authenticate (e.g., using a public key infrastructure) user device 120 for association with the telephone line to prevent unauthorized access of the telephone line. If user device 120 is authenticated, bridge device 110 may create a virtual extension of the telephone line (e.g., associated the POTS-based telephone number) to user device 120. User device 120 may communicate IP-based call request 410 to IP network 150, IP network 150 may route call request 410 to bridge device 110, and/or bridge device 110 may receive call request 410.

As further shown in FIG. 6, the call request may be connected to a POTS-based line associated with the POTS-based telephone number (block 630). For example, in one implementation described above in connection with FIGS. 3A, 3B, and/or 4A, bridge device 110 may generate outgoing POTS-based call request 420 from IP-based call request 410. In one example, bridge device 110 (e.g., via remote pathway connection circuitry 310) may tap into a voice portion of POTS/optical line 320, and/or may create a bridge between POTS/optical line 320 and IP line 330 to generate outgoing POTS-based call request 420 from IP-based call request 410.

Returning to FIG. 6, the call may be completed to a device associated with the call request (block 640). For example, in one implementation described above in connection with FIG. 4A, bridge device 110 may complete outgoing POTS-based call request 420 by sending outgoing POTS-based call request 420 to a device associated with call request 420, via PSTN/optical network 140. In one example, PSTN/optical network 140 may route call request 420 to the telephone number dialed by user device 120 (e.g., a telephone number within the local calling area).

FIG. 7 depicts a flow chart of an exemplary process 700 for connecting a received call associated with a POTS-based telephone number to an IP-based device according to implementations described herein. In one implementation, process 700 may be performed by bridge device 110. As illustrated, process 700 may begin by authenticating the IP-based device for association with the POTS-based telephone number (block 710), and/or receiving a call to the POTS-based telephone number (block 720). For example, in one implementation described above in connection with FIG. 4B, prior to receiving POTS-based received call 440, user of user device 120 may generate a request (e.g., a connection request) to access bridge device 110 associated with the user's home/work POTS-based telephone number. Bridge device 110 may receive the access/connection request (e.g., requesting creation of a virtual extension of a POTS-based telephone line connecting bridge device 110 to PSTN/optical network 140) from user device 120. Bridge device 110 may authenticate (e.g., using a public key infrastructure) user device 120 for association with the telephone line to prevent unauthorized access of the telephone line. If user device 120 is authenticated, bridge device 110 may create a virtual extension of the telephone line (e.g., associated with the POTS-based telephone number) to user device 120, and/or may receive POTS-based received call 440.

As further shown in FIG. 7, the POTS-based received call may be connected to an IP-based connection (block 730). For example, in one implementation described above in connection with FIGS. 3A, 3B, and/or 4B, bridge device 110 may generate IP-based received call 450 from POTS-based received call 440. In one example, bridge device 110 (e.g., via remote pathway connection circuitry 310) may tap into a voice portion of POTS/optical line 320, and/or may create a bridge between POTS/optical line 320 and IP line 330 to generate IP-based received call 450 from POTS-based received call 440.

Returning to FIG. 7, the received call may be completed to the IP-based device (block 740). For example, in one implementation described above in connection with FIG. 4B, bridge device 110 may complete IP-based received call 450 by sending IP-based received call 450 to user device 120, via IP network 150. IP network 150 may receive IP-based received call 450, and/or may route IP-based received call 450 to user device 120. In one example, IP network 150 may route IP-based received call 450 to a user device associated with bridge device 110 (e.g., with the POT-based telephone number associated with bridge device 110).

FIG. 8 depicts a flow chart of an exemplary process 800 for creating a virtual extension of a POTS-based telephone line to an IP-based device according to implementations described herein. In one implementation, process 800 may be performed by bridge device 110. As illustrated, process 800 may begin by receiving a request to create a virtual extension from the IP-based device (block 810), and/or authenticating the IP-based device for association with the POTS-based telephone line (block 820). For example, in one implementation described above in connection with FIG. 1, bridge device 110 may receive a request, from a remote IP-based device (e.g., user device 120), to create a virtual extension of a telephone line (e.g., a POTS-based telephone line) connecting bridge device 110 to PSTN/optical network 140. Bridge device 110 may authenticate (e.g., using a public key infrastructure) user device 120 for association with the telephone line to prevent unauthorized access of the telephone line.

As further shown in FIG. 8, a virtual extension of the POTS-based telephone line to the IP-based device may be created (block 830), and/or the virtual extension may enable placing and/or receiving calls by the IP-based device (block 840). For example, in one implementation described above in connection with FIG. 1, if user device 120 is authenticated, bridge device 110 may create the virtual extension of the telephone line to the remote IP-based device. The virtual extension may enable a user, connected via IP network 150 with the telephone line (e.g., via user device 120), to receive an incoming call on the telephone line, to place an outgoing call on the telephone line, and/or to join in a conference with other devices (e.g., a POTS-based telephone associated with the telephone line, other user devices connected to the telephone line, etc.) on the telephone line. In one example, a user away from home may access (e.g., with user device 120) their home telephone line (e.g., via the virtual extension created by bridge device 110), and may place and/or receive calls within a home calling area without accruing toll charges or spending money on additional equipment and/or services (e.g., additional wireless telephone minutes).

Returning to FIG. 8, the virtual extension may enable the IP-based device to "phone home for free" (block 850). For example, in one implementation described above in connection with FIG. 1, the virtual extension of the telephone line may enable the remote IP-based device (e.g., user device 120) to "phone home for free." In one example, a user away from home may access (e.g., with user device 120) their home telephone line (e.g., via the virtual extension), and may use an intercom feature to call a home device (e.g., a handset) associated with the home telephone line. The intercom feature may cause the home device to ring, and, if answered, may connect the remote user to the home device without accruing toll charges or spending money on additional equipment and/or services.

Implementations described herein may include systems and methods that allow a POTS-based telephone line to be operated from a remote device that may be connected via an IP network. For example, in one implementation, the systems and methods may allow a user to place and/or receive calls through a POTS-based telephone number, and/or may allow the user to keep in contact with other people in the home and/or at work. The systems and methods may provide to the user the same telephone capabilities as if the user picked up a telephone in another room in the home. However, since an IP network may be used, the user may be located anywhere in the world instead of in another room.

The foregoing description of implementations provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5-8, the order of the acts may be modified in other implementations. Further, non-dependent acts may be performed in parallel.

Also, the terms "user" and "customer" have been used herein. The terms "user" and "customer" are intended to be broadly interpreted to include user device 120 or a user or customer of user device 120.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method comprising:
   receiving a request from an Internet Protocol (IP)-based device to create a virtual extension of a plain old telephone service (POTS)-based telephone line;
   authenticating the IP-based device for association with the POTS-based telephone line;
   creating the virtual extension of the POTS-based telephone line to the IP-based device when the IP-based device is authenticated;
   enabling placement of a call by the IP-based device to a POTS-based device, associated with the POTS-based telephone line, enabling the placement of the call including:
      receiving, from the IP-based device, a call request to a POTS-based telephone number;
      connecting the call request to the POTS-based telephone line; and
      completing the call request to the POTS-based device; and
   enabling the IP-based device, via the virtual extension, to use an intercom feature associated with the POTS-based device.

2. The method of claim 1, further comprising:
   enabling receipt of calls by the IP-based device via the virtual extension.

3. The method of claim 2, where enabling receipt of calls comprises:
   receiving the call to a POTS-based telephone number associated with the POTS-based telephone line;
   connecting the received call to an IP-based connection associated with the IP-based device; and
   completing the received call to the IP-based device.

4. The method of claim 3, where completing the received call to the IP-based device includes:
   sending the received call to the IP-based device via an IP network.

5. The method of claim 1, where the intercom feature connects the IP-based device to the POTS-based device associated with the POTS-based telephone line without accruing toll charges.

6. The method of claim 1, further comprising:
   providing a connection for the POTS-based telephone line;
   providing a connection for an IP-based line associated with the IP-based device; and
   bridging the POTS-based connection and the IP-based connection to create the virtual extension.

7. The method of claim 6, where bridging the POTS-based connection and the IP-based connection creates a pathway for connection to the POTS-based telephone line by the IP-based line.

8. The method of claim 1, further comprising:
   authenticating the IP-based device using a public key infrastructure.

9. The method of claim 1, where the request is received by a bridge device, the bridge device including a plurality of ports for receiving the request and enabling the placement of the call.

10. A device comprising:
    an interface for communicating with a plain old telephone service (POTS)-based telephone line;
    an interface for communicating with an Internet Protocol (IP)-based device; and
    processing logic to:
       receive a request from the IP-based device to create a virtual extension of the POTS-based telephone line,
       create the virtual extension of the POTS-based telephone line to the IP-based device based on the request;
       enable placement of a call by the IP-based device to a POTS-based device, associated with the POTS-based telephone line, via the virtual extension, when enabling the placement of the call, the processing logic being further to:
          receive, from the IP-based device, a call request to a POTS-based telephone number;
          connect the call request to the POTS-based telephone line; and
          complete the call request to the POTS-based device; and
       enable the IP-based device, via the virtual extension, to use an intercom feature associated with the POTS-based device.

11. The device of claim 10, where the processing logic is further to:
    authenticate the IP-based device for association with the POTS-based telephone line.

12. The device of claim 10, where the processing logic is further to:
    enable receipt of calls by the IP-based device via the virtual extension.

13. The device of claim 12, where:
    the POTS-based interface receives a call from the POTS-based telephone line; and
    the processing logic is further to:
       connect the received call to the IP-based interface, and
       complete the received call to the IP-based device via the IP-based interface.

14. The device of claim 13, where, when completing the received call to the IP-based device via the IP-based interface, the processing logic is further to:
    send the received call to the IP-based device via an IP network.

15. The device of claim 10, where the intercom feature connects the IP-based device to the POTS-based device associated with the POTS-based telephone line without accruing toll charges.

16. The device of claim 10, where the processing logic is further to:
    bridge the POTS-based interface and the IP-based interface to create the virtual extension.

17. The device of claim 16, where the processing logic is further to:
    bridge the POTS-based interface and the IP-based interface to create a pathway for connection to the POTS-based telephone line by the IP-based device.

18. The device of claim 10, further comprising:
    logic to authenticate the IP-based device for association with the POTS-based telephone line using a public key infrastructure.

19. The device of claim 10, where the device is a bridge device.

20. A system comprising:
    means for receiving a request from an Internet Protocol (IP)-based device to create a virtual extension of one of a plain old telephone service (POTS)-based telephone line or an optical network-based line;
    means for creating the virtual extension of one of the POTS-based telephone line or the optical network-based line to the IP-based device based on the request;

means for enabling placement of a call by the IP-based device to a device associated with one of the POTS-based telephone line or the optical network-based line, the means for enabling placement the placement of the call including:
    means for receiving, from the IP-based device, a call request to a POTS-based telephone number;
    means for connecting the call request to the POTS-based telephone line; and
    means for completing the call request to the POTS-based device; and
means for enabling the IP-based device, via the virtual extension, to use an intercom feature associated with the device.

21. The system of claim 20, further comprising:
means for authenticating the IP-based device for association with one of the POTS-based telephone line or the optical network-based line prior to creating the virtual extension.

22. The system of claim 20, further comprising:
means for enabling receipt of calls by the IP-based device via the virtual extension.

23. The system of claim 20, further comprising:
means for authenticating the IP-based device for association with the POTS-based telephone line or the optical network-based line using a public key infrastructure.

* * * * *